(12) United States Patent
Jin

(10) Patent No.: US 7,542,601 B2
(45) Date of Patent: Jun. 2, 2009

(54) METHOD FOR ENHANCING IMAGE QUALITY BY SATURATION

(75) Inventor: Eui-Jung Jin, Chungcheongbuk-do (KR)

(73) Assignee: MagnaChip Semiconductor, Ltd., Chungcheonbuk-Do (KR)

( * ) Notice: Subject to any disclaimer, the term of this patent is extended or adjusted under 35 U.S.C. 154(b) by 998 days.

(21) Appl. No.: 11/081,570

(22) Filed: Mar. 15, 2005

(65) Prior Publication Data
US 2006/0210187 A1 Sep. 21, 2006

(30) Foreign Application Priority Data
Apr. 27, 2004 (KR) .................... 10-2004-0029018

(51) Int. Cl.
G06K 9/40 (2006.01)
H04N 9/64 (2006.01)
H04N 5/14 (2006.01)
(52) U.S. Cl. .................. 382/167; 382/254; 348/703; 348/707
(58) Field of Classification Search ............ 382/167, 382/254, 263, 266; 348/208.13, 255, 256, 348/300, 301, 532, 534, 603, 627, 645, 703, 348/707
See application file for complete search history.

(56) References Cited

U.S. PATENT DOCUMENTS 7,248,296 B2 * 7/2007 Iketani ............... 348/255
7,349,574 B1 * 3/2008 Sodini et al. ........... 382/168

FOREIGN PATENT DOCUMENTS

KR 1998-072857 11/1998

* cited by examiner

*Primary Examiner*—Abolfazl Tabatabai
(74) *Attorney, Agent, or Firm*—Blakely, Sokoloff, Taylor & Zafman LLP

(57) ABSTRACT

The present invention relates to a method for enhancing an image quality by saturation. The method includes the step of: determining a minimum gain value 'SatGainMin' and a maximum gain value 'SatGainMax' of a gain value 'PGain' of a pre-amplifier; defining a first to a third ranges based on the 'SatGainMin' and the 'SatGainMax'; determining whether a currently used saturation value 'USat' is equal to or greater than approximately 1; determining whether the 'PGain' is less than the 'SatGainMin'; performing saturation by using a value in the first range as an actual saturation value 'ASat' when 'PGain'< 'SatGainMin'; determining whether the 'PGain' is equal to or less than the 'SatGainMax'; performing saturation by using a value in the second range as the 'ASat' when 'SatGainMin'≦'PGain'≦'SatGainMax'; and performing saturation by using a value in the third range as the 'ASat' when 'PGain'>'SatGainMax'.

13 Claims, 3 Drawing Sheets

METHOD FOR ENHANCING IMAGE QUALITY BY SATURATION

FIELD OF THE INVENTION

The present invention relates to an image enhancement method; and more particularly, to a method for enhancing an image quality by eliminating noise based on color saturation in a low light level.

DESCRIPTION OF THE RELATED ARTS

An image sensor is a device that generates an image by using a characteristic of semiconductors that are reactive to light. The image sensor detects brightness and wavelengths of different lights emitted from objects. Then, the image sensor reads the detection in an electrical value. Particularly, the image sensor changes this electrical value into a level that can be processed in a signal.

That is, the image sensor is a semiconductor device that converts an optical image into an electrical signal. Among various types of image sensors, a charge coupled device (CCD) is a device in which charge carriers are stored into and transferred to metal oxide semiconductor (MOS) capacitors closely allocated with each other. A complementary metal oxide semiconductor (CMOS) image sensor adopts a switching mode that detects outputs sequentially with use of MOS transistors prepared as many as pixels by employing CMOS technology in which a control circuit and a signal processing circuit are used as a peripheral circuit. Because of low power consumption, the CMOS image sensor can be widely applied to personal portable systems such as cellular phones, cameras for use in personal computers and medical fields and the like.

The CMOS image sensor has a function to enhance an image that is deteriorated because of technical limitations in a pixel arrangement and so on. That is, the image enhancement function enables a user to see an image in a better or a desired color balance by modifying contrast, brightness, hue and saturation.

FIG. 1 is a diagram briefly illustrating a conventional method for changing a saturation value.

The image enhancement function based on the change in the saturation value makes a color tone darker by multiplying a saturation value set by a user with values of digital signals that are converted from analog signals outputted from a pixel array of a CMOS image sensor except for a brightness component 'Y', i.e., signals Cb and Cr. A reference numeral 100 denotes the multiplication step. Once being determined, the saturation value identically affects signals or noise regardless of brightness of an external environment.

Meanwhile, since the analog signals outputted through the pixel array are weak, the analog signals are amplified by a pre-amplifier that adds a gain per each brightness level to the analog signals. The above saturation effect makes the color balance more colorful in an appropriate level of the brightness. However, when in a low level of the brightness where a signal level and a noise level exhibit less difference, the signal amplified through the gain by the pre-amplifier and the noise are amplified again by the above saturation. Thus, the noise effect on the image becomes more severe.

Accordingly, it is necessary to prevent noise generation caused by the color saturation effect at a low level of the brightness in consideration of the gain by the pre-amplifier during the image enhancement function based on the change in the saturation value.

SUMMARY OF THE INVENTION

It is, therefore, an object of the present invention to provide a method for enhancing an image quality by suppressing noise generation caused by color saturation in a low level of brightness when an image enhancement function is activated by changing a saturation value.

In accordance with an aspect of the present invention, there is provided a method for enhancing an image quality by changing a saturation value through converting analog signals outputted from an pixel array of an image sensor into digital signals and then multiplying a saturation value set by a user with signal values 'Cr' and 'Cb' except for a brightness component 'Y' among the digital signals, wherein the analog signals which are weak are divided into a first to a third ranges based on a minimum gain value 'SatGainMin' and a maximum gain value 'SatGainMax' of a gain value 'PGain' of a pre-amplifier for amplifying the analog signals through changing a gain per brightness level, the method is carried out by: using N which is a positive integer as an actual saturation value 'ASat' in the first range where the 'PGain' is less than the 'SatGainMin'; using M which is a positive integer equal to or less than the N as the 'ASat' in the third range where the 'PGain' is greater than the 'SatGainMax'; and using a value of a linear function with a slope decreasing linearly from the N to the M as the 'ASat' in the second range where the 'PGain' is equal to or greater than the 'SatGainMin' and equal to or less than the 'SatGainMax'.

In accordance with another aspect of the present invention, there is provided a method for enhancing an image quality by changing a saturation value through converting analog signals outputted from an pixel array of an image sensor into digital signals and then multiplying a saturation value set by a user with signal values 'Cr' and 'Cb' except for a brightness component 'Y' among the digital signals, the method comprising the steps of: determining a minimum gain value 'SatGainMin' and a maximum gain value 'SatGainMax' of a gain value 'PGain' of a pre-amplifier for amplifying the analog signals through changing a gain per brightness level because the analog signals are weak; defining a first to a third ranges based on the 'SatGainMin' and the 'SatGainMax' of the 'PGain'; determining whether or not a currently used saturation value 'USat' is equal to or greater than 1; determining whether or not the 'PGain' is less than the 'SatGainMin' upon the determination that the 'USat' is equal to or greater than 1; performing saturation by using a value corresponding to the first range as an actual saturation value 'ASat' when the 'PGain' is less than the 'SatGainMin'; determining whether or not the 'PGain' is equal to or less than the 'SatGainMax' when the 'PGain' is equal to or greater than the 'SatGainMin'; performing saturation by using a value corresponding to the second range as the 'ASat' when the 'PGain' is equal to or greater than the 'SatGainMin' and equal to or less than the 'SatGainMax'; and performing saturation by using a value corresponding to the third range as the 'ASat' when the 'PGain' is greater than the 'SatGainMax'.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

A method for enhancing an image quality by saturation in accordance with a preferred embodiment of the present invention will be described in detail with reference to the accompanying drawings.

Figure 1:
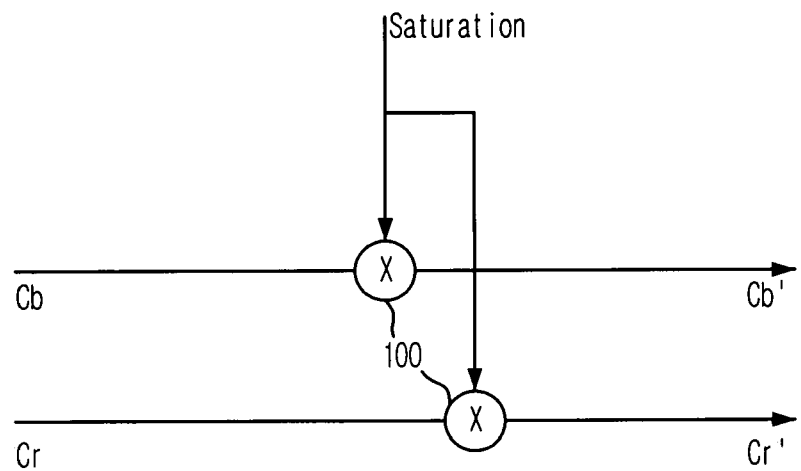
FIG. 1 is a diagram briefly illustrating a conventional method for changing a saturation value.
Figure 2:
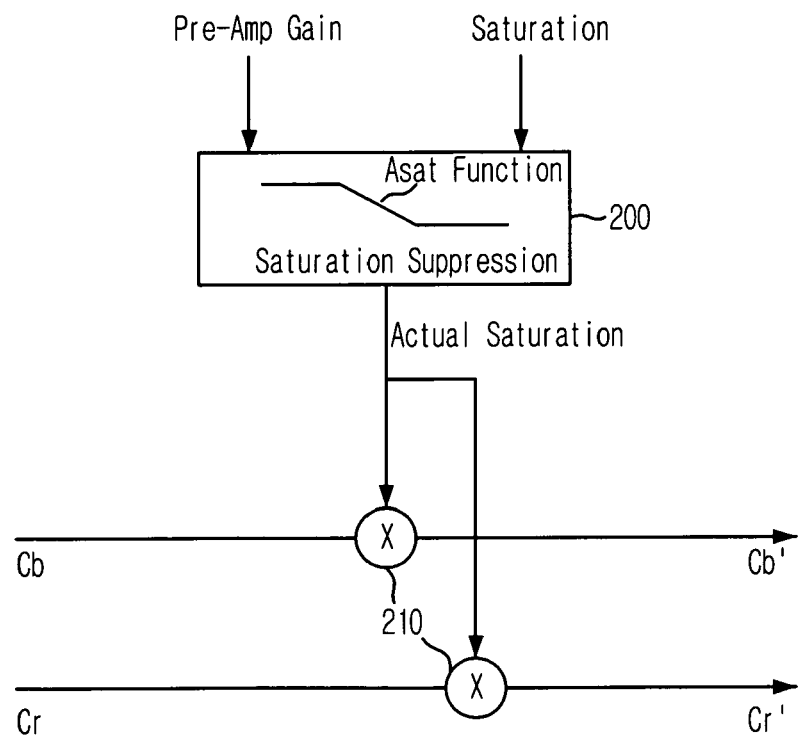
FIG. 2 is a block diagram briefly illustrating a method for changing a saturation value under a saturation suppression mode in accordance with a preferred embodiment of the present invention.

FIG. 2 is a block diagram briefly showing a saturation method implemented with a saturation suppression mode in accordance with a preferred embodiment of the present invention.

As shown, a pre-amplifier operates to change a gain value based on a change in brightness and thus, the change in the gain value is an indicator of the change in the brightness. When an image enhancement function is activated by the change in the saturation value, the saturation value set by a user is changed according to an increment of the gain by the pre-amplifier.

That is, a saturation suppression block 200 is further added to a typically employed saturation system. The saturation suppression block 200 operates based on a functional relationship with a variable of actual saturation 'ASat' reflecting a gain by the pre-amplifier. This actual saturation variable 'ASat' is multiplied with signals Cb and Cr to output signals Cb' and Cr' completed with the saturation. This multiplication step is denoted with a reference numeral 210. As a result of the application of the actual saturation, it is possible to enhance a color tone acquired by the saturation and simultaneously to offset a noise effect which becomes severe at a low level of brightness.

Figure 3:
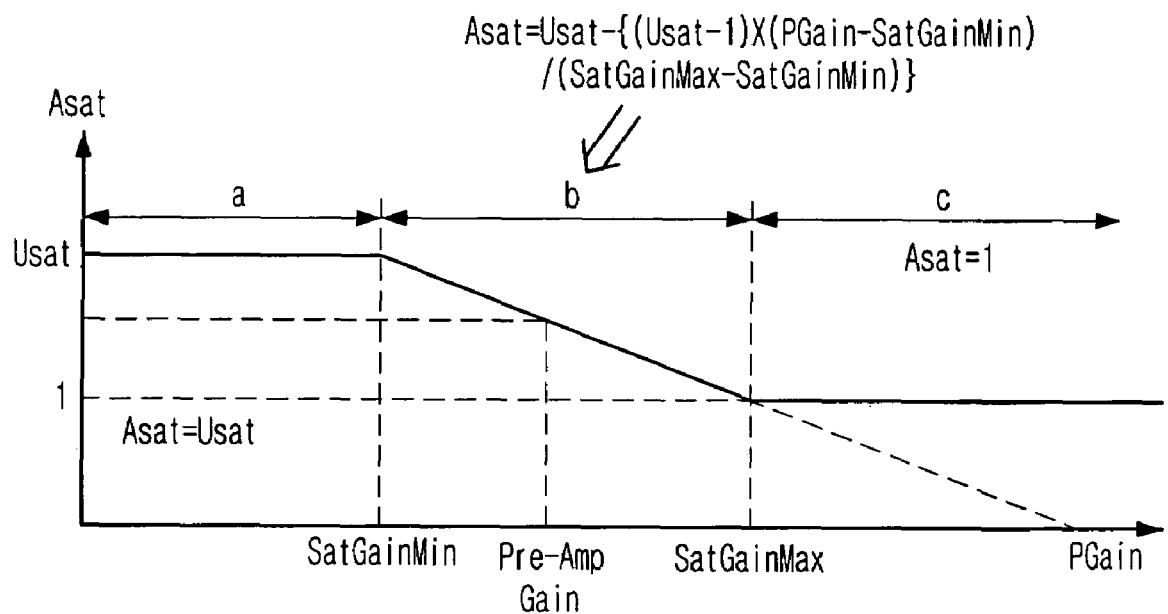
FIG. 3 is a graph obtained when a function of a saturation suppression mode is applied in accordance with the preferred embodiment of the present invention.

FIG. 3 is a graph obtained when a function of a saturation suppression mode is applied in accordance with the preferred embodiment of the present invention.

According to the disclosed method, analog signals outputted through the pixel array are converted into digital signals, and then, a saturation value set by a user is multiplied with signal values of Cb and Cr except for the brightness component. Thus, during the saturation operation for enhancing a color tone, this change in the saturation value provides an effect of enhancing an image quality.

Referring to FIG. 3, since an analog signal outputted through the pixel array is weak, the analog signal is divided into three ranges of 'a', 'b' and 'c' according to a minimum value 'SatGainMin' and a maximum value 'SatGainMax' of a gain 'PGain' by the pre-amplifier for varying a gain of the analog signal per brightness level and subsequently amplifying the analog signal.

Also, in the range of 'a' in which the gain 'PGain' is less than the minimum gain value 'SatGainMin', 'N', which is a positive integer, is used as the actual saturation value 'ASat'. Also, in the range of 'c' in which the gain 'PGain' is greater than the maximum gain value 'SatGainMax', 'M', which is a positive integer equal to or less than the 'N', is used as the actual saturation value 'ASat'. In addition, in the range of 'b' in which the gain 'PGain' is greater than the minimum gain value 'SatGainMin' and less than the maximum gain value 'SatGainMax', a value of a linear function linearly decreasing from 'N' to 'M' is used as the actual saturation value 'ASat'.

At this time, in the ranges of 'a', 'b' and 'c', a currently used actual saturation value 'USat' is equal to or greater than "1." In the range of 'a', 'N' is equal to 'USat', and 'M' is equal to "1" in the range of 'c'.

Meanwhile, in the range of 'b', the linear function of 'ASat' is expressed as the following equation.

$$ASat = USat - \left\{ \frac{(USat - 1) \times (PGain - SatGainMin)}{(SatGainMax - SatGainMin)} \right\} \quad \text{Eq. 1}$$

Since the gain value 'PGain' increases going from the range of 'a' to the range of 'c', the brightness level of the image becomes lower going from 'a' to 'c'. Herein, in the range of 'b', the slope of the linear function of 'ASat' is a negative value of '-(USat-1)/(SatGainMax-SatGainMin)'.

When the suppression is applied to the whole range of the gain of the pre-amplifier, a color tone effect by the color saturation is diminished at a brightness level with a noise level lower than the signal level, i.e., at a low brightness level. Thus, the suppression is set to be performed in a linear manner from a predetermined brightness level. In case of a very dark condition even within the range of the low brightness level, a slight trace of color saturation causes noise to be amplified, thereby pronouncing the noise effect on the image. This case corresponds to the range of 'c' and in this case, instead of applying the saturation value, the original signal values 'Cb' and 'Cr' are applied by fixing the saturation value as "1."

That is, the aforementioned ranges 'a', 'b' and 'c' are a saturation range in which the original saturation value is applied, a suppression range in which the suppression is performed and a non-saturation range in which the saturation value is not applied, respectively. Herein, a user sets the minimum gain value SatGainMin of the pre-amplifier at which the suppression range starts and the maximum gain range value SatGainMax at which the non-saturation range starts.

As shown in FIG. 3, the saturation value inputted to a register is converted into the actual saturation value 'ASat' depending on the fact that the currently used saturation value 'USat' corresponds to which range of the gain by the pre-amplifier 'PGain' and has which value. After the conversion, a final saturation value is applied.

Figure 4:
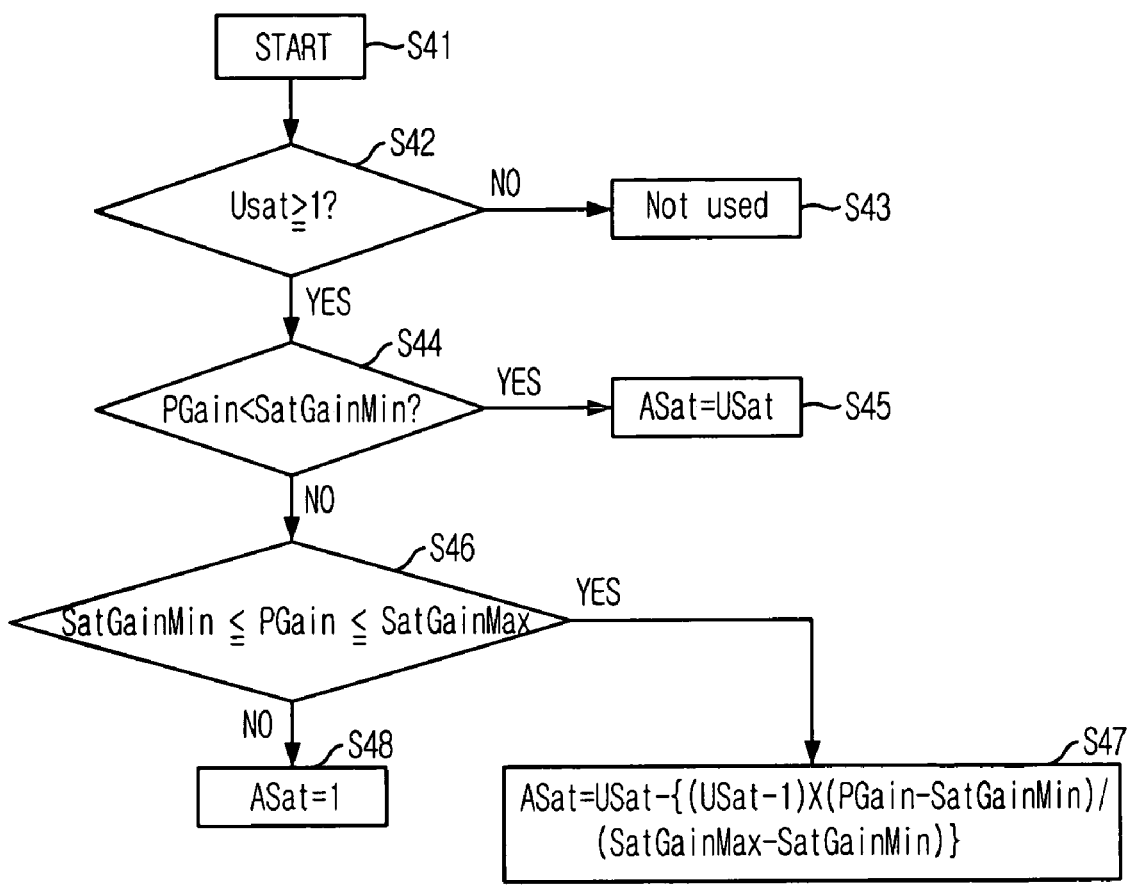
FIG. 4 is a flowchart illustrating an image enhancement function to which a saturation suppression mode is applied in accordance with the present invention.

FIG. 4 is a flowchart illustrating an image enhancement function by a saturation method implemented with a saturation suppression mode in accordance with the preferred embodiment of the present invention. Hereinafter, the saturation operation will be described.

At step S41, a maximum value 'SatGainMax' and a minimum value 'SatGainMin' of a gain by the pre-amplifier 'PGain' are first determined. Then, as shown in FIG. 3, the ranges 'a', 'b' and 'c' representing the saturation range, the suppression range and the non-saturation range, respectively are defined based on the maximum value 'SatGainMax' and the minimum value 'SatGainMin'. Afterwards, a saturation suppression operation starts.

Next, at step S42, the currently used saturation value 'USat' is determined whether or not to be greater than "1." At this time, when the currently used saturation value 'USat' is less than "1," at step S43, the suppression is not performed at any brightness level. Therefore, the preferred embodiment of the present invention is not applicable when the currently used saturation value 'USat' is less than "1."

If the currently used saturation value 'USat' is equal to or greater than "1," at step S44, it is determined whether the gain by the pre-amplifier 'PGain' is less than the minimum gain value 'SatGainMin'. If the gain by the pre-amplifier 'PGain' is less than the minimum gain value 'SatGainMin', at step S45, the saturation is carried out by using an actual saturation value corresponding to the range of 'a'. At this time, since the range of 'a' corresponds to an image with a high brightness level, the currently used saturation value 'USat' is used as the actual saturation value 'ASat'.

If the gain by the pre-amplifier 'PGain' is equal to or greater than the minimum gain value 'SatGainMin', at Step S46, it is determined whether the gain by the pre-amplifier 'PGain' is equal to or less than the maximum gain value 'SatGainMax'. That is, it is checked whether the gain by the pre-amplifier corresponds to the case of 'SatGainMin≦PGain≦SatGainMax'.

If the gain by the pre-amplifier 'PGain' is equal to or greater than the minimum gain value 'SatGainMin' and equal to or less than the maximum gain value 'SatGainMax', i.e., 'SatGainMin≦PGain≦SatGainMax', at step S47, the saturation proceeds by using the actual saturation value 'Asat' corresponding to the range of 'b'. At this time, the range 'b' follows the function of 'ASat' with a negative slope linearly decreasing from the currently used saturation value 'USat' employed as the actual saturation value 'Asat' at the range of 'a' to the value of "1" employed as the actual saturation value 'ASat' at the range of 'c'. Herein, the linear function in the range of 'b' is expressed as Equation 1 mentioned above. On the basis of the linear function, the suppression saturation is carried out at Step S46.

If the gain by the pre-amplifier 'PGain' is greater than the maximum gain value 'SatGainMax', the saturation proceeds by employing the actual saturation value 'ASat' corresponding to the range of 'c'. That is, since an image at the range of 'c' has a low level of brightness, the actual saturation value 'ASat' is "1", thereby outputting the original signal values of 'Cr' and 'Cb'.

When the above saturation operation is applied, the saturation value at the low brightness level becomes smaller. Thus, it is possible to diminish the noise effect which becomes severe by the saturation operation.

In accordance with the preferred embodiment of the present invention, for the image enhancement function by a change in the saturation value, the saturation is carried out by varying the saturation value set by a user based on the gain by the pre-amplifier. As a result, it is possible to offset the noise effect which becomes severe at the low brightness level and thus, to enhance an image quality. In addition, the disclosed image enhancement method can be applied to other types of image forming apparatus.

The present application contains subject matter related to Korean patent application No. KR 2004-0029018, filed in the Korean Patent Office on Apr. 27, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A method for enhancing an image quality by changing a saturation value through converting analog signals outputted from a pixel array of an image sensor into digital signals and then multiplying a saturation value set by a user with signal values 'Cr' and 'Cb' except for a brightness component 'Y' among the digital signals, wherein the analog signals which are weak are divided into a first to a third ranges based on a minimum gain value 'SatGainMin' and a maximum gain value 'SatGainMax' of a gain value 'PGain' of a pre-amplifier for amplifying the analog signals through changing a gain per brightness level, the method is carried out by a saturation suppression block to perform the following steps:

using N which is a positive integer as an actual saturation value 'ASat' in the first range where the 'PGain' is less than the 'SatGainMin';

using M which is a positive integer equal to or less than the N as the 'ASat' in the third range where the 'PGain' is greater than the 'SatGainMax'; and using a value of a linear function with a slope decreasing linearly from the N to the M as the 'ASat' in the second range where the 'PGain' is equal to or greater than the 'SatGainMin' and equal to or less than the 'SatGainMax'.

2. The method of claim 1, wherein a currently used saturation value 'USat' in the first range to the third range is equal to or greater than approximately 1.

3. The method of claim 2, wherein the N in the first range is the 'USat'.

4. The method of claim 3, wherein the M in the third range is approximately 1.

5. The method of claim 4, wherein the value of the linear function used as the 'ASat' in the second range is defined as:

$$USat - \left\{ \frac{(USat - 1) \times (PGain - SatGainMin)}{(SatGainMax - SatGainMin)} \right\}.$$

6. The method of claim 1, wherein the image has a low level of brightness going from the first range to the third range.

7. A method for enhancing an image by changing a saturation value through converting analog signals outputted from an pixel array of an image sensor into digital signals and then multiplying a saturation value set by a user with signal values 'Cr' and 'Cb' except for a brightness component 'Y' among the digital signals, the method a saturation suppression block to perform the following steps:

determining a minimum gain value 'SatGainMin' and a maximum gain value 'SatGainMax' of a gain value 'PGain' of a pre-amplifier for amplifying the analog signals through changing a gain per brightness level because the analog signals are weak;

defining a first to a third ranges based on the 'SatGainMin' and the 'SatGainMax' of the 'PGain';

determining whether a currently used saturation value 'USat' is equal to or greater than approximately 1;

determining whether the 'PGain' is less than the 'SatGainMin' upon the determination that the 'USat' is equal to or greater than approximately 1;

performing saturation by using a value corresponding to the first range as an actual saturation value 'ASat' when the 'PGain' is less than the 'SatGainMin';

determining whether the 'PGain' is equal to or less than the 'SatGainMax' when the 'PGain' is equal to or greater than the 'SatGainMin';

performing saturation by using a value corresponding to the second range as the 'ASat' when the 'PGain' is equal to or greater than the 'SatGainMin' and equal to or less than the 'SatGainMax'; and performing saturation by using a value corresponding to the third range as the 'ASat' when the 'PGain' is greater than the 'SatGainMax'.

8. The method of claim 7, wherein a suppression saturation operation is not performed when the 'USat' is less than approximately 1.

9. The method of claim 7, wherein the 'ASat' in the first range is N which is a positive integer; the 'ASat' in the third range is M which is a positive integer equal to or less than the N; and the 'ASat' in the second range is a value of a linear function with a slope decreasing linearly from the N to the M.

10. The method of claim 9, wherein the N is the 'USat'.

11. The method of claim 10, wherein the M is approximately 1.

12. The method of claim 11, wherein the linear function used in the second range is defined as:

$$ASat = USat - \left\{ \frac{(USat-1) \times (PGain - SatGainMin)}{(SatGainMax - SatGainMin)} \right\}.$$

13. The method of claim 12, wherein the image has a low level of brightness going from the first range to the third range.

* * * * *